United States Patent
Yan et al.

(10) Patent No.: US 7,672,964 B1
(45) Date of Patent: Mar. 2, 2010

(54) METHOD AND SYSTEM FOR DYNAMICALLY INITIALIZING A VIEW FOR A STREAMING DATA BASE SYSTEM

(75) Inventors: Weipeng Paul Yan, Redwood City, CA (US); Diaz H. Nesanoney, Atherton, CA (US); Fayyaz Ahmad Younas, Fremont, CA (US); Maurice Mate Radalj, San Francisco, CA (US); Nasrollah Jazayeri, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 10/750,507

(22) Filed: Dec. 31, 2003

(51) Int. Cl.
*G06F 7/00* (2006.01)
*G06F 17/00* (2006.01)

(52) U.S. Cl. .............. 707/102; 707/2; 707/3; 707/4; 707/5; 707/9; 707/10; 707/100; 707/101; 707/104.1; 707/200; 707/201; 707/202; 707/203

(58) Field of Classification Search .............. None
See application file for complete search history.

(56) References Cited

U.S. PATENT DOCUMENTS

| | | | |
|---|---|---|---|
| 6,112,198 A | 8/2000 | Lohman et al. | |
| 6,272,502 B1 * | 8/2001 | Lieuwen et al. | 707/203 |
| 6,289,335 B1 | 9/2001 | Downing et al. | |
| 6,292,803 B1 * | 9/2001 | Richardson et al. | 707/102 |
| 6,480,836 B1 * | 11/2002 | Colby et al. | 707/3 |
| 6,505,188 B1 | 1/2003 | Ghazal et al. | |
| 6,636,875 B1 | 10/2003 | Bashant et al. | |
| 6,681,230 B1 | 1/2004 | Blott et al. | |
| 6,725,287 B1 * | 4/2004 | Loeb et al. | 710/8 |
| 6,785,673 B1 * | 8/2004 | Fernandez et al. | 707/3 |
| 6,882,977 B1 * | 4/2005 | Miller | 705/10 |
| 7,043,727 B2 | 5/2006 | Bennett et al. | |
| 7,124,204 B2 | 10/2006 | Givoly et al. | |
| 7,139,844 B2 | 11/2006 | Smith et al. | |
| 7,440,963 B1 * | 10/2008 | Bello et al. | 707/3 |
| 7,448,048 B1 * | 11/2008 | Nesamoney et al. | 719/318 |
| 2002/0060696 A1 | 5/2002 | Seetharaman et al. | |
| 2002/0062237 A1 | 5/2002 | Matsumoto et al. | |
| 2002/0194095 A1 * | 12/2002 | Koren | 705/35 |
| 2003/0018506 A1 * | 1/2003 | McLean et al. | 705/7 |

(Continued)

OTHER PUBLICATIONS

U.S. Appl. No. 10/446,336, filed May 27, 2003 entitled "Method for Providing a Real Time View of Heterogeneous Enterprise Data" by Nesamoney et al.

(Continued)

*Primary Examiner*—Khanh B Pham
*Assistant Examiner*—Usmaan Saeed
(74) *Attorney, Agent, or Firm*—Shumaker & Sieffert, P.A.

(57) ABSTRACT

A method for dynamically initializing a view for a streaming database system. The method includes accessing a stream of events. An initial view is materialized from the stream, wherein the initial view comprises a dynamically defined view of the stream of events from the streaming database system. The method also includes processing a plurality of recent view snapshots from the initial view. A view state derived from each of the recent view snapshots is generated. An updated view is subsequently maintained in accordance with the view state, wherein the updated view incorporates new events of the stream.

27 Claims, 10 Drawing Sheets

U.S. PATENT DOCUMENTS

| | | |
|---|---|---|
| 2003/0033179 A1 | 2/2003 | Katz et al. |
| 2003/0212789 A1* | 11/2003 | Hamel et al. .................. 709/225 |
| 2003/0225769 A1* | 12/2003 | Chkodrov et al. ........... 707/100 |
| 2003/0225820 A1* | 12/2003 | Chkodrov et al. ........... 709/201 |
| 2003/0227479 A1* | 12/2003 | Mizrahi et al. ............... 345/753 |
| 2004/0019684 A1* | 1/2004 | Potter et al. .................. 709/227 |
| 2004/0030739 A1* | 2/2004 | Yousefi'zadeh ............. 709/201 |
| 2004/0034661 A1 | 2/2004 | Barron et al. |
| 2004/0128342 A1* | 7/2004 | Maes et al. .................. 709/200 |
| 2004/0186860 A1 | 9/2004 | Lee et al. |
| 2004/0267828 A1* | 12/2004 | Zwilling et al. ............. 707/200 |
| 2005/0091180 A1* | 4/2005 | Peleg et al. ..................... 707/1 |
| 2005/0198614 A1 | 9/2005 | Mavashev et al. |

OTHER PUBLICATIONS

U.S. Appl. No. 10/446,338, filed May 27, 2003 entitled "Method for Performing Real-Time Analytics Using a Business Rules Engine on Real-Time Heterogenous Materialized Data Views" by Nesamoney et al.

U.S. Appl. No. 10/749,317, filed Dec. 31, 2003 entitled "A Method and System for Dynamically Joining Views That Share a Common Key in a Streaming Database System" by Yan et al.

U.S. Appl. No. 60/941,166, filed May 31, 2007 entitled "Streaming Multidimensional Data by Bypassing Multidimensional Query Processor" by Gupta.

* cited by examiner

450

$$
\begin{aligned}
&\text{select} && t_1.c_1 \\
&\text{from} && t_1 \\
&\text{where} && t_1.c_1 = t_1.c_3 \quad \text{and} \\
&&& t_1.c_2 \quad \text{in} \\
&&& (\text{select} \quad t_2.c_1 \\
&&& \phantom{(}\text{from} \quad\quad t_2 \\
&&& \phantom{(}\text{group by} \ t_2.c_3)
\end{aligned}
$$

452 → { (select ... where block)
451 → { (subquery block)

FIG. 4B

METHOD AND SYSTEM FOR DYNAMICALLY INITIALIZING A VIEW FOR A STREAMING DATA BASE SYSTEM

This case is related to commonly assigned United States Patent Application "A METHOD AND SYSTEM FOR DYNAMICALLY JOINING VIEWS THAT SHARE A COMMON KEY IN A STREAMING DATABASE SYSTEM", by Yan W., et al., filed on Dec. 31, 2003, Ser. No. 10/749,317.

FIELD OF THE INVENTION

The present invention relates to the field of business intelligence. More specifically, embodiments of the present invention relates to a method and system for dynamically joining views of enterprise data in a streaming database.

BACKGROUND OF THE INVENTION

Business intelligence and data warehousing software enable information from disparate parts of an enterprise to be obtained with relative ease. Great decision-making benefits are generated by business intelligence (BI). BI software integrates querying, reporting, on-line analytic processing (OLAP), data mining, and data warehousing functionality.

Such decision-making benefits are provided by BI software because they enable a user to process information from as many databases as comprises a business (or other) organization's data storage resources. Further, BI software allows analysis of needed transactions and summaries, without having to know which databases, servers, and/or other information sources from which the information underpinning such transactions and summaries were derived.

By way of background with respect to the applications to business and other enterprises, an 'event' represents a business event, which is a business activity, transaction, or a change in the state of a business entity, for instance, in a large business. Implicitly, events comprise a time of occurrence and an identity. Examples of events include, but are not limited to, issuing a purchase order, taking a customer service call, replenishing supplies, issuing a forecast, and posting an expense item.

A 'context' represents data associated with an event. Typically, contexts are data that are descriptive of the events. A context can also comprise historic summary data, which can be available in a data warehouse or operational data store (ODS). Context data may also be obtained from other systems of record. Context data provides additional information that may be required for adding meaning to an event. Context data, in so far as it can be conventionally utilized, can be evaluated to ascertain whether or not a given event should trigger a heightened state of scrutiny and observation by analysts of the business environment in which a business or other enterprise is immersed.

Modern businesses face significant and increasing needs to obtain real time access to key business events. This need, for instance, can be expressed as a requirement from a business person that indicates that the certain business metrics need to be monitored in real-time or that when certain changes in these metrics caused by various business events imply adverse conditions or an opportunity, this is cause for an 'alert', e.g., notation of event occurrence, and heightened monitoring of associated data thereafter.

The event, for example could be an increase in call volume into a call center, inventory falling below a certain threshold level, a drop in a demand forecast, increase in the number of returns of a certain product, or that defect rates from a test system exceeded pre-specified limits, etc. At the occurrence of such an event, the business person may want a corresponding alert to attract and guide her/his attention.

Conventional reporting and analysis software (variously called Business Intelligence, Query and reporting tools, Data warehouses etc.) ("BI software") all provide reporting and analysis of business data. They do so by either executing queries directly against operational systems or by extracting and transforming in batches, operational data to an independent data store (sometimes called a data warehouse or data mart).

The above method by conventional reporting software results in the usage of a fixed (or static) data model from which data is analyzed. As a result of that, alert conditions cannot be detected without repeatedly running the reports on the data model, often resulting in poor performance of reports or an impact on the operational system itself, if reports are being run directly on it. In addition since the data is often extracted in batches, the resulting metrics are often from hours to days old and therefore unsuitable for real-time analytics.

Some conventional reporting products contain alerting technology, however the alerting is based on repeated processing of batch data and on a fixed data model that is inflexible to the needs of real-time analytics.

Other mechanisms, also called event management software provides for alert conditions to be detected and alerts sent, however, it similarly uses fixed data models and batch updates to the data model and suffers the associated drawbacks described above.

Without event processing capabilities, the ability to combine events with context, and powerful business rules processing capability, the ability of a business organization or a similar organization utilizing BI software to engage in real time data analysis is limited. Lacking ability to engage in real time data analysis, a business organization or a similar organization utilizing BI software has only a limited capability at best to react instantaneously to changes in its business and to the business environment in which it operates.

SUMMARY OF THE INVENTION

Embodiments of the present invention provide a method and system for dynamically initializing a view for a streaming data base system. Embodiments of the present invention comprises capturing a stream of operational events in real time and materializing one or more resulting views. Each resulting view comprises a dynamically defined view of the stream of events and provides visibility into a current state of the operational system. Embodiments of the present invention dynamically update two or more of such views. Embodiments of the present invention implement a method for initializing a materialized view and dynamically re-initializing a view.

In one embodiment, the present invention is implemented as a method for dynamically initializing a view for a streaming database system. The method includes accessing a stream of events. An initial view is materialized from the stream, wherein the initial view comprises a dynamically defined view of the stream of events from the streaming database system. The method also includes processing a plurality of recent view snapshots from the initial view. A view state derived from each of the recent view snapshots is generated. An updated view is subsequently maintained in accordance with the view state, wherein the updated view incorporates new events of the stream.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4B shows the manner in which view statefulness determinations are made in accordance with one embodiment of the present invention.

DETAILED DESCRIPTION OF THE INVENTION

Figure 1A:
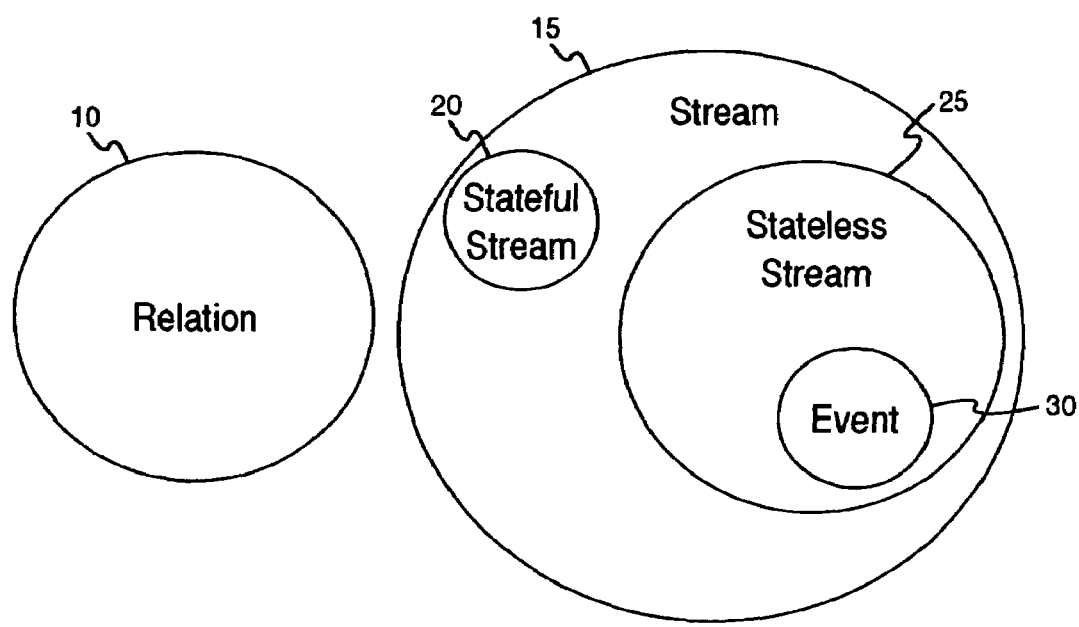
FIG. 1A shows a Venn diagram illustrating the inter-relationship between a relation, a stream, a stateful stream, a stateless stream, and an event, in accordance with one embodiment of the present invention.

Reference will now be made in detail to the preferred embodiments of the present invention, a method and system for dynamically initializing a view for a streaming database system, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention provide a method and system for dynamically initializing a view for a streaming data base system. Embodiments of the present invention comprise capturing a stream of operational events in real time and materializing one or more resulting views. Each resulting view comprises a dynamically defined view of the stream of events and provides visibility into a current state of the operational system. Embodiments of the present invention dynamically update two or more of such views and implement a method for initializing a materialized view and dynamically re-initializing a view.

Thus, an embodiment of the present invention overcomes the limitations of conventional BI software, which is neither sufficiently event-definitive nor context-definitive, which assumes data is operated on in scheduled batches, which is not event driven, and which is not external to a particular database system. An embodiment of the present invention readily formulates and sustains a maintainable real time view of business events, such as transactions, and related occurrences, incidents, and circumstances. The view can be an asynchronous one. Further, an embodiment of the present invention has contextually interpretive and dynamically predictive capability.

Additional descriptions regarding the incorporation of real-time views of enterprise data and the performance of real-time analytics using a business rules engine can be found in the United States Patent Applications "METHOD FOR PROVIDING A REAL TIME VIEW OF HETEROGENEOUS ENTERPRISE DATA", by Diaz H. Nesamoney, et al., U.S. patent application Ser. No. 10/446,336, filed on May 27, 2003, and "METHOD FOR PERFORMING REAL-TIME ANALYTICS USING A BUSINESS RULES ENGINE ON REAL-TIME HETEROGENEOUS MATERIALIZED DATA VIEWS" by Diaz H. Nesamoney, et al., U.S. patent application Ser. No. 10/446,338, filed on May 27, 2003, which are incorporated herein in their entirety.

Notation and Nomenclature

Some portions of the detailed descriptions which follow are presented in terms of procedures, steps, logic blocks, processing, and other symbolic representations of operations. These operations are typically implemented by a processor altering data structures within a computer memory. Accordingly, a procedure, computer executed step, logic block, process, etc., is here, and generally, conceived to be a self-consistent sequence of steps or instructions leading to a desired result.

Terms used to describe the functions and functionality of embodiments of the present invention are now defined. As the terms are used herein, the following terms can have meanings comprising the following definitions.

An "event" is any change in the value of a critical data element in a transactional system that must be captured for the purpose of monitoring its value.

A "context" is additional information added to an event to make it easier and/or more profitable to analyze the event to determine whether action is needed.

"Event context" is the combination of an event view with a context. An event context can be an entity on which an end user alerting business rule is built. Event context appears in one embodiment as a simple view in Structured Query Language (SQL), for purposes of defining rules for alert generation. Context can comprise, for example, historical data.

A "stream" is the result of a query operator, like join, aggregation, or projection, on streams and relations. An event is a stream.

A "view" is a stream that is resulted from a view definition query.

A "stateless stream" is defined as a stream of unbound data that is insert-only. A second name for this kind of stream can be "insert-only stream". An event is a stateless stream. It also applies to streams that result from, for example, a joining of two stateless streams without a group by and set function, or a join between a stateless stream and a relation. It should be noted that a stateless stream may still maintain states on data that it has processed. The term "stateless" implies that the stream does not inform subscribers to update the rows that were previously published. It always publishes new rows.

However, the stream itself may still maintain state for the purpose of producing the next row.

A "stateful stream" is a bounded stream of data that can provide both inserts and updates. A second name for this kind of stream is "insert-update stream". The term "stateful" implies that the stream informs the user regarding changes of its state by issuing updates to its subscribers.

Figure 1B:
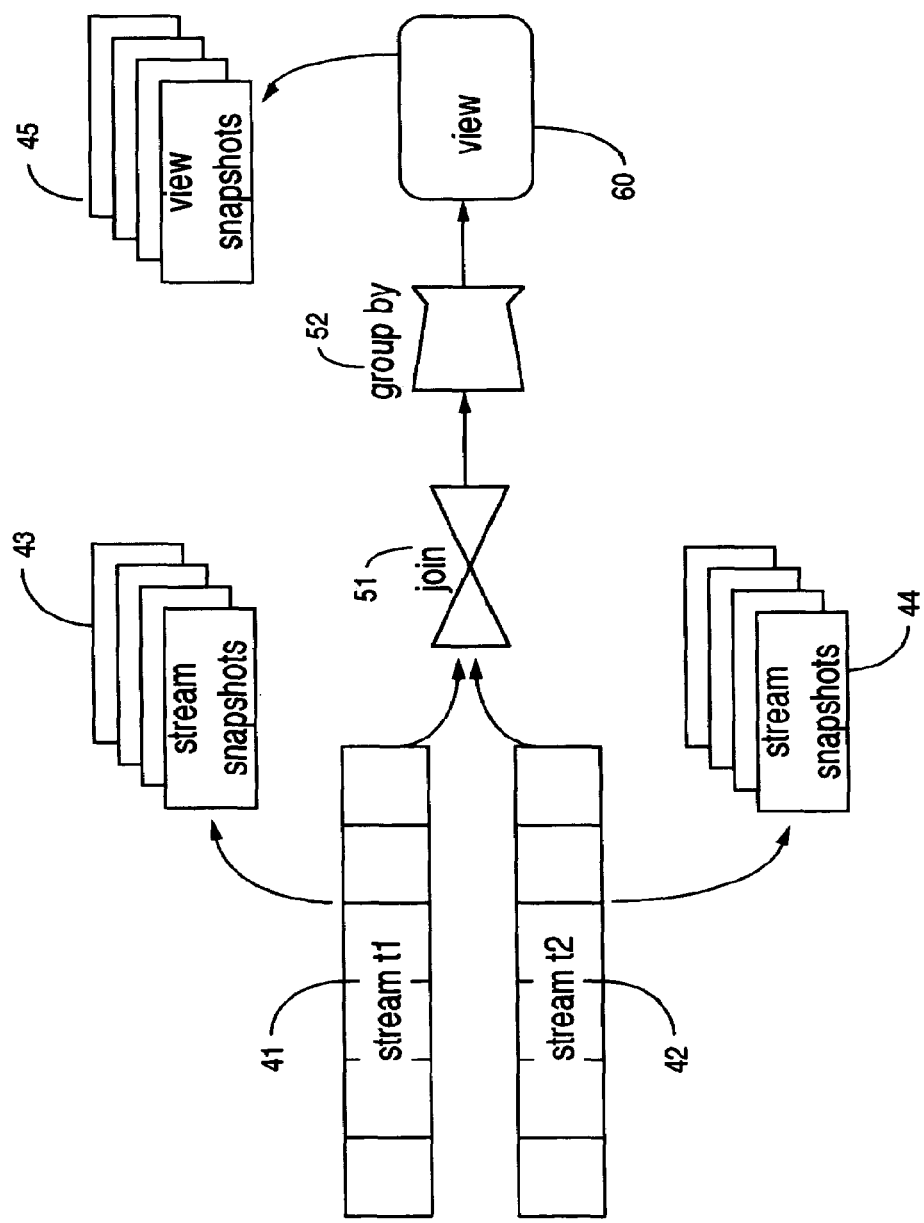
FIG. 1B shows a diagram illustrating the inter-relationships between stream snapshots and view snapshots in accordance with one embodiment of the present invention.
Figure 1C:
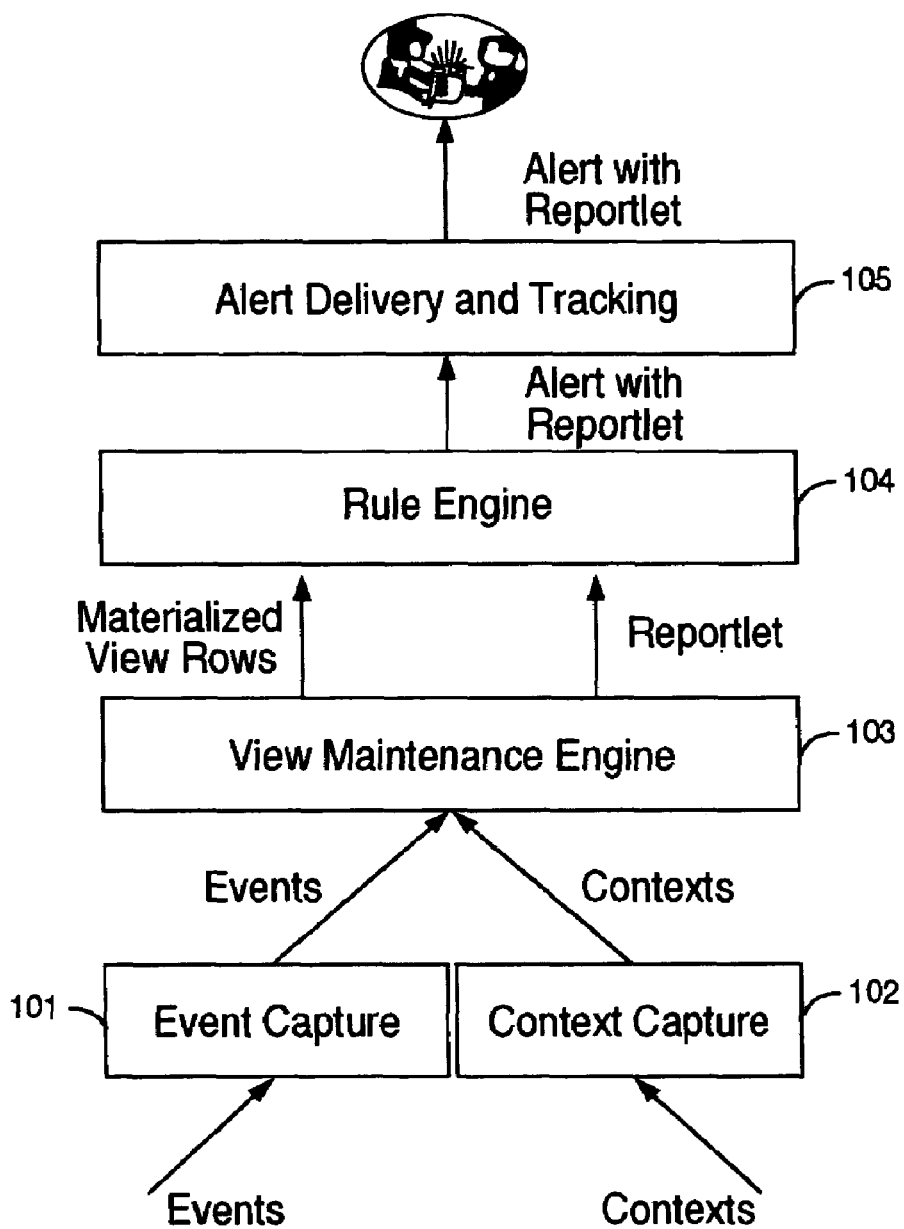
FIG. 1C depicts a system for generating a real time view of heterogeneous enterprise data, according to one embodiment of the present invention.

A "relation" is a virtual table representing data that is stored in some foreign source, not in the BAM server (e.g., BAM server 100 of FIG. 1C). It is modeled in the BAM server 100 as a regular relational database table. The data can reside on ordinary files, on a RDBMS system, on a non-relational DBMS, or can be real time non-stored data-like sensor data. These data may be available through web a service, JDBC API, or some other foreign data wrappers. The BAM server 100 embodiment supports JDBC and web service access to these data. Thus, a relation is some times referred as foreign relation.

FIG. 1A shows a Venn diagram illustrating the inter-relationship between a relation 10, a stream 15, a stateful stream 20, a stateless stream 25, and an event 30, in accordance with one embodiment of the present invention. FIG. 1B shows a diagram illustrating the inter-relationships between stream snapshots and view snapshots in accordance with one embodiment of the present invention.

As used herein, stream snapshots are typically produced as the result of an intermediate operator within a given query block. In other words, a stream snapshot is a result from an intermediate operator that feeds its result into one or more higher order operators within the query block. A view snapshot is a special case of a stream snapshot. A view snapshot is typically produced as the result of a higher order operator, or final operator, of the outermost query block.

An exemplary query block is shown below. The below query block is visually depicted in FIG. 1B.

select t1.c1-sum(t2.c3) as sum-c3 from t1,t2 where t1.c1=t2.c2 group by t1.c1

In the above query block, t1 and t2 are streams 41 and 42 respectively as shown in FIG. 1B. Accordingly, they produce stream snapshots 43 and 44. The streams 41 and 42 serve as input streams to an intermediate join operator 51 to produce a new stream, which in turn, is an input to a "group by" operator 52. Any snapshots of this new stream (e.g., produced by the join operator 51) are also referred to as stream snapshots. The stream produced by the group by operator 52 is the final result of the query block, and is thus referred to as a view (e.g., view 60). Hence, snapshots of the view 60 are referred to as view snapshots (e.g., view snapshots 45) as opposed to stream snapshots. In this example, the joint operator 51 is stateless, the group by operator 52 is stateful, and the resulting view is stateful.

The terms "current stream snapshot" and "current view snapshot" are now described. A current stream snapshot for a stateful stream contains all rows in the stream. The current stream snapshot for a stateless stream contains only the rows corresponding to the last event id just processed. The current view snapshot has a definition similar to that of a current stream snapshot. A current view snapshot is produced by a view (e.g., view 60) publishing its current snapshot (e.g., one of snapshots 45). The publishing will send the current view snapshot to any subscriber of that view. For each event, a view publishes its current view snapshot.

The terms "recent stream snapshot" and "recent view snapshot" are now described. The recent stream/view snapshot for a stream/view contains all current stream/view snapshots that have ever been emitted by the stateless stream/view, excluding those view snapshots that have expired from the view. CSQL allows the user to specify a time base or event base window for a view such that the current view snapshots that are not in the window are removed from the recent view snapshot.

An Exemplary System

Basic System Overview:

FIG. 1C depicts a system 100 for generating a real time view of heterogeneous enterprise data, according to one embodiment of the present invention. System 100 thus functions as a business activity monitoring (BAM) system.

System 100 provides a real time view of heterogeneous enterprise data of an operational system, comprising capturing a stream of operational events in real time and materializing a resulting view. The resulting view comprises a dynamically defined view of the stream of events and provides visibility into a current state of the operational system.

There are two fundamental ways of entering data into system 100: push and pull. System 100 can subscribe to some events and the event data would then be pushed to the system. System 100 can also pull data for events and contexts using queries in the source system format.

Push of data into system 100 is done asynchronously. System 100 subscribes to event publishers, through asynchronous publishing mechanisms such as a Java messaging service (JMS) message bag. Pulling of data into system 100 is accomplished through the issuing of synchronous (blocking) queries to the source systems.

System 100 models the event as an event view, and the context data as a context view. Events are captured by an event capturer 101, which outputs the captured event to a view maintenance engine 103. Contexts are captured by a context capturer 102, which outputs the captured context to the view maintenance engine 103.

View maintenance engine 103 materializes views as rows. View maintenance engine 103 outputs materialized view rows, along with any corresponding reportlets it generates, to a rule engine 104.

Rule engine 104 applies a business rule to each materialized view and outputs an alert where the rule holds true to an alert deliverer/tracker 105. The alert is sent along with any corresponding reportlets.

Alert deliverer/tracker 105 delivers and tracks the alert, along with any reportlets, to users. The alert and any reportlets can be sent by any of a variety of media, such as email, a hypertext transfer page (HTTP) format, and/or a spreadsheet.

Figure 2:
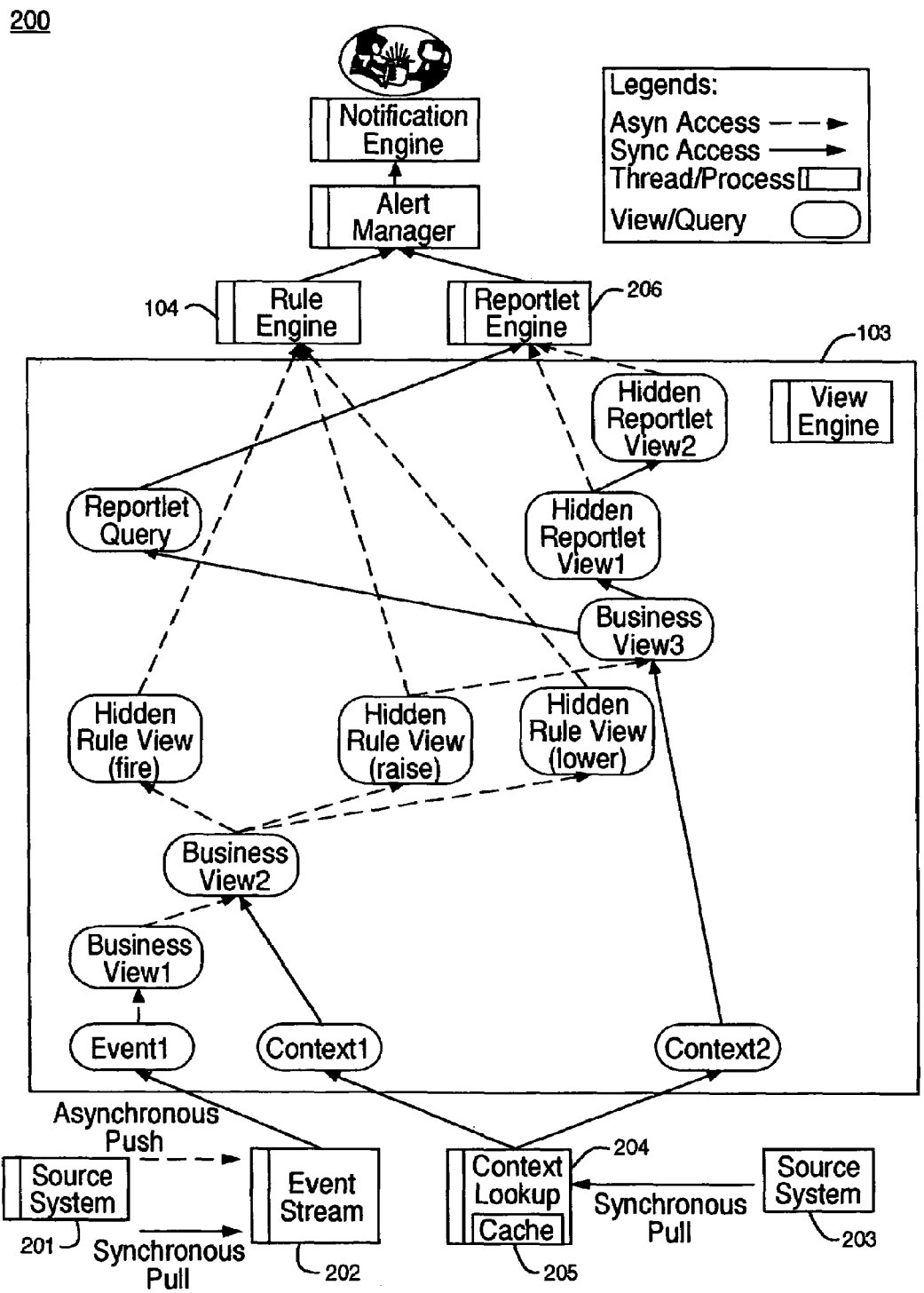
FIG. 2 depicts a view engine, according to one embodiment of the present invention.

Exemplary View Engine:

FIG. 2 depicts view maintenance engine 103, according to one embodiment of the present invention. The view engine 103 maintains (e.g., functions as) a main memory system that processes the event streams entering system 100, continuously maintains the views, and provides the materialized view rows to the rule engine and the reportlet engine. The view engine 103 also provides a limited query capability for a reportlet engine 206. Business users use the materialized views to define business rules online. Further, view engine 103 maintains a time dimension, allowing for temporal or time series analysis of events and data.

There are two kinds of views: business views and hidden views. The business views are the views defined by application developers and used by the business users to define business rules. The hidden views are defined by the rule engine 104 and reportlet engine 206 for the purpose of evaluating rules.

The hidden views are therefore generated by the system 100 and are not visible to the users. The hidden views are processed similarly as the business views. Therefore for clarity, brevity, and ease of explanation, reference to business views herein also includes reference to hidden views, unless otherwise noted explicitly.

An event stream thread 202 is asynchronously pushed or synchronously pulled from a source system 201. View engine 103 receives an event from event stream thread 202 of event capturer 101 (FIG. 1C).

Context 204 can include historical or other data meaningful to an event. Context 204 can add significance to the event. The context 204, modeled as a relation, has a local cache 205 that can return cached context look up query result. Context 204 can be synchronously pulled by context capturer 102 (FIG. 1C) from a source system 203, such as a data warehouse.

Business view 1 is formed from Event 1. Event 1 is joined with Context 1 to form Business view 2. Hidden rule view Fire, hidden rule view Raise, and hidden rule view Lower arise from Business view 2. Hidden rule view Raise is joined with Context 2 to form Business view 3, which synchronously sends a reportlet query to reportlet engine 206. Business view 3 can also asynchronously form a Hidden Reportlet view 1 which can be sent to reportlet engine 206. Hidden reportlet view 1 can also synchronously form Hidden Reportlet view 2. Hidden Reportlet views 1 and 2 are asynchronously sent to reportlet engine 206. Hidden rule views Fire, Raise, and Lower are sent asynchronously to rule engine 104.

Figure 3:
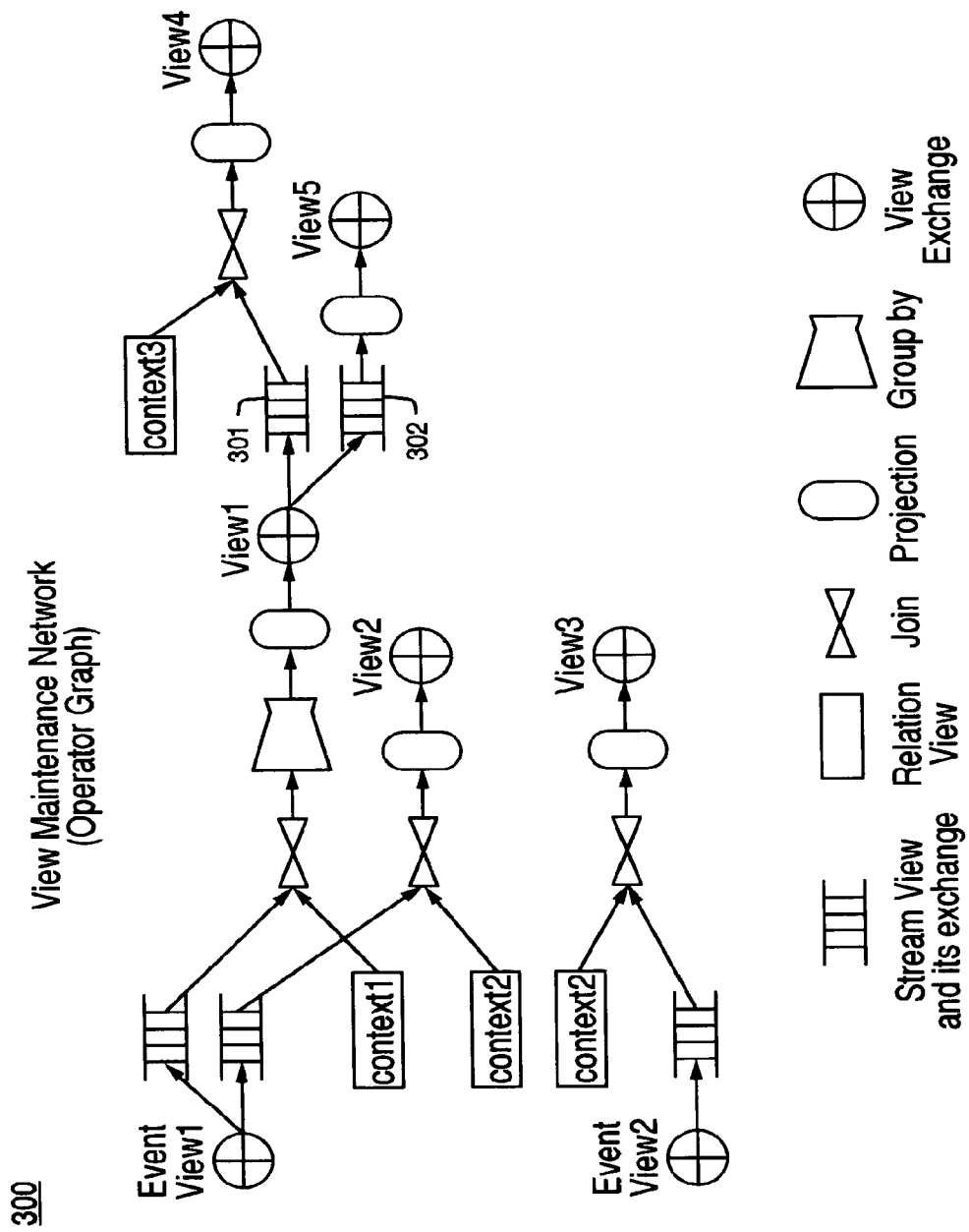
FIG. 3 depicts a view maintenance network, according to one embodiment of the present invention.

Exemplary View Maintenance Network:

FIG. 3 depicts an exemplary such view maintenance network, according to one embodiment of the present invention. Each node in the network represents an operator. Views are expressed in the form of a query language such as SQL. The following shows an example of a business view "price_and_ inventory_monitor".

Select os_prod_id as pim_prod_id
Mov_avg(os.os_unit_price, month, 1) as pim_unit_price,
Mov_sum(pi.pi_inv_level, day, 2) as pim_inventory_level
From order_status os, product_inventory pi
Where pi.pi_prod_id=os.os_prod_id
Group by os_prod_id The above view captures, on a per product basis, the monthly moving average of the selling price of a product, and the 2-day moving total of its inventory levels across all warehouses. The order_status is an event stream and product_inventory is a context view. A view (e.g., views 1-5) comprises the result of the join of an event view (e.g., event views 1, 2) or a view (called an input stream) with a number of context views (called a relation; e.g., contexts 1-3). Each view would then publish stream data (called an output stream; e.g., output streams 301, 302) as the result of the view maintenance. The result of one view's output stream can be subscribed by another view (e.g., views 4, 5) as an input stream, and the entire system thus becomes a view maintenance network 300.

Figure 4A:
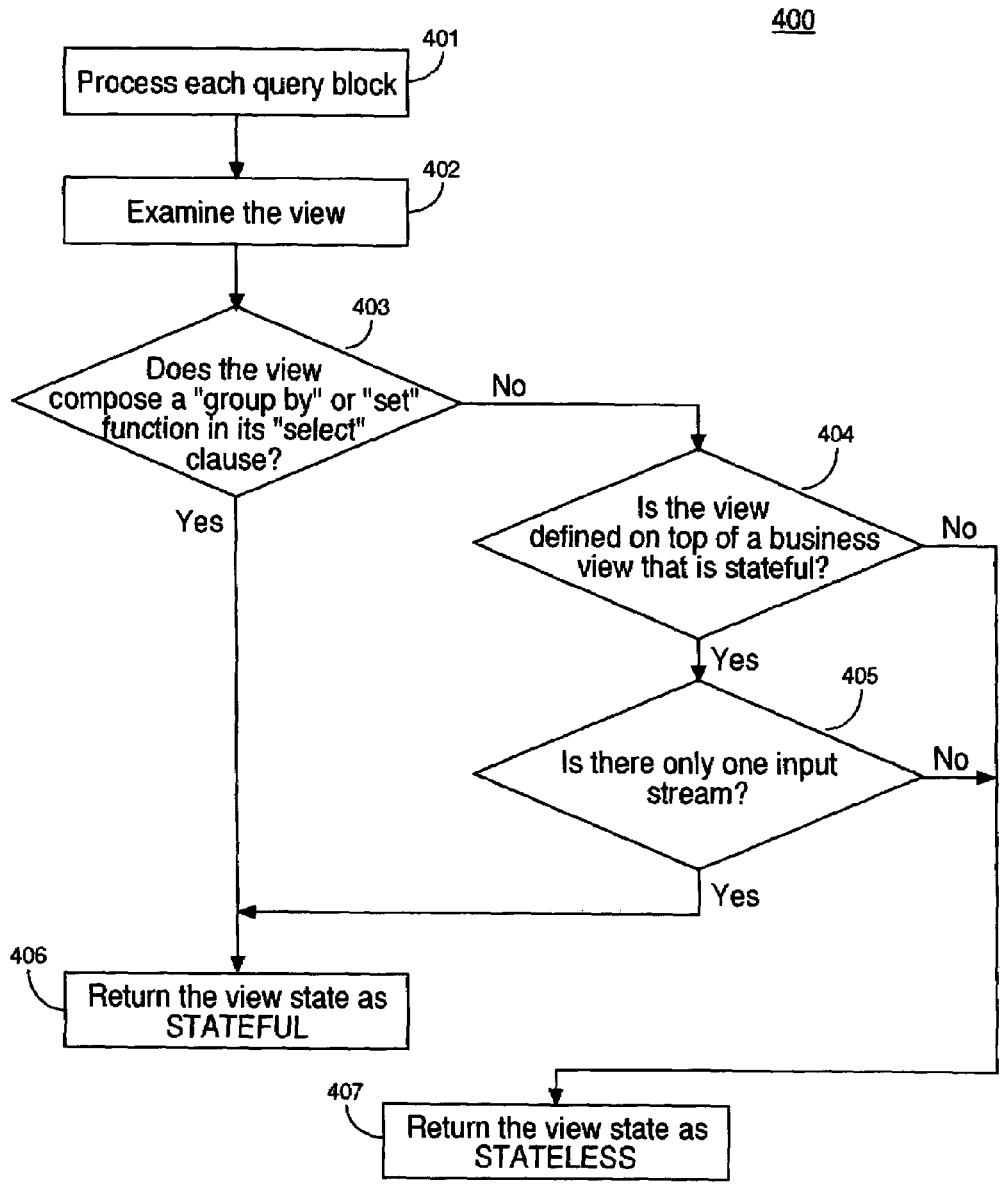
FIG. 4A shows a view statefulness algorithm in accordance with one embodiment of the present invention.

View Statefulness Algorithm:

FIG. 4A shows a view statefulness algorithm (e.g., process 400) in accordance with one embodiment of the present invention. As described above, a view is a stateless view if it is not stateful. An event view (e.g., event views 1, 2; FIG. 3) is stateless. A view is stateful if it contains a "group by" clause or any "set" function in the "select" clause, or if it is defined on top of a stateful view. Thus, the steps of the process 400 for determining whether a view is stateful or stateless are depicted in FIG. 4A. Additionally, it should be noted that this determination is made for each query block (e.g., as illustrated in FIG. 4B).

Process 400 begins in step 401, where each query block of an SQL query is processed and examined. In step 402, the corresponding view for the query block is examined. In step 403, it is determined whether the view comprises a "group by" clause or a "set" function in a "select" clause. If so, then in step 406, the view state 'STATEFUL' is returned, at which point process 400 can be complete for the given query block. If not, then in step 404, it is determined whether the view is defined on top of a business view that is itself stateful. If so, then in step 405, is determined whether there is only one input stream for the view. If both of these conditions (e.g., 404 and 405) are true, then process 400 proceeds step 406 and returns the view state 'STATEFUL'. If either one of these conditions is false, process 400 proceeds to step 407, where the view state 'STATELESS' is returned, completing process 400.

FIG. 4B shows the manner in which view statefulness determinations are made in accordance with one embodiment of the present invention. In the present embodiment, the system sets the view state in a bottom up fashion. Those views upon which other views are defined are marked for statefulness before the other views (e.g., defined on top of them) are marked. This property is illustrated by the SQL pseudo code 450 of FIG. 4B. The pseudo code 450 shows a typical SQL query block 451 and a higher level SQL query block 452. As described above, the statefulness determination is made the query block 451 before the query block 452 (e.g., which is defined on top of block 451).

Join Overview:

There are generally two factors that determine how a join should be performed between two input tables: contribution window and distance window. The contribution window specification of a stream participating in a join defines the set of rows contributed to the join by the stream. For example, during a synchronized join, when a stateless stream participates in a synchronized join, its contribution window contains the rows corresponding to the last event id. When a stateful stream participates in a synchronized join, its contribution window contains all rows produced by the view. A distance window refers to the distance between two input streams that defines the timing of the join. It specifies when the join should occur in response to an update of the input streams. For example, during a synchronized join, the distance window between the two input streams is 0 in terms of an event id when processing the next event id.

The following operators result in a stateless stream: a stateless stream synchronized join with a stateless or stateful stream; a stateless stream join with a context; a synchronized join between stateful streams; and a window projection on a stateless stream.

Figure 5:
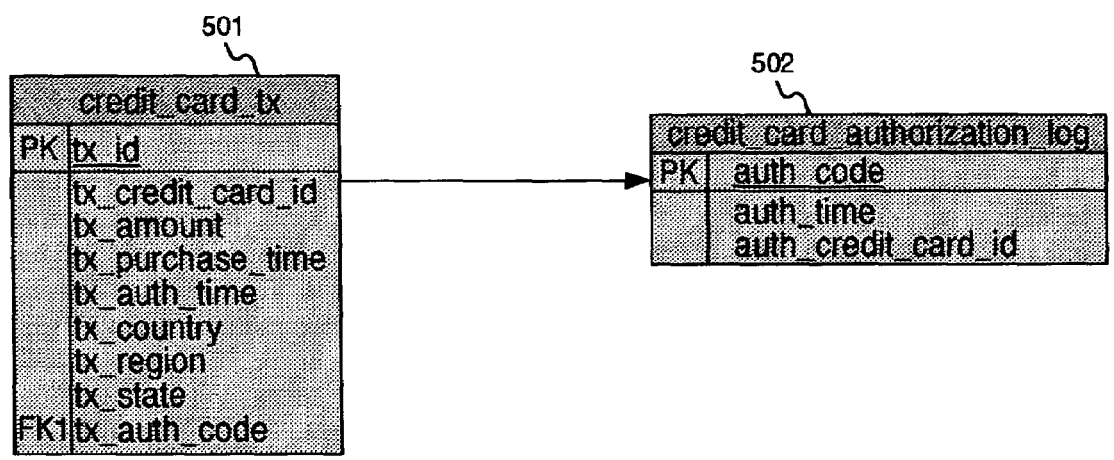
FIG. 5 shows an event and context data structure example in accordance with one embodiment of the present invention.

FIG. 5 shows an event and context data structure example in accordance with one embodiment of the present invention. FIG. 5 shows a synchronized join example.

Referring to FIG. 5, assume that there is an event stream credit_card_tx 501 where each event records one credit card transaction. As shown in FIG. 5, credit_card_tx 501 contains the fields (tx_id, tx_credit_card_id, tx_amount, tx_purchase_ time, tx_auth_code, tx_country, tx_region, tx_state), which represents credit card transaction id, credit card number, transaction amount, time of purchase, and credit card authorization code. Credit_card_tx 501 also contains a hierarchy of location information: country, region and state. A credit card is charged only when a phone modem call is made from the merchant to the credit card company and an authorization code is obtained to both lock down the credit amount and guarantee the credit to the merchant.

Assume also that there is a credit_card_authorization_log context table 502 that is updated once nightly. The table 502 contains the following fields: (auth_code, auth_time, auth_credit_card_id) representing the authorization code, time and the credit card number. The following function syntax examples (e.g., V1 through V12) show the very useful functionalities provided by the above synchronized join semantics.

A stateful stream and stateless stream Cartesian product synchronized join example is now described.

V1: total_tx: (total credit card transaction amount)
    select sum(tx_amount) as total_amount
    from credit_card_tx.

V2: percent_tx_per_card: (percent of total spending per credit w.r.t. to the total credit spending).
    select tx2.tx_credit_card_id, sum(tx_amount)/total_amount
      from total_tx as tx1
      credit_card_tx as tx2
      group by tx2.tx_credit_card_id A stateful stream and stateless stream synchronized join (produces stateless stream) is now described.

V3: Mov_avg_amount_per_tx_per_card: (3 month moving average of purchase amount per credit card.)
    select tx_credit_card_id as ma_credit_card_id, mov_avg (tx_amount, month, 3) as ma__3month_mov_avg
      from credit_card_tx
      group by credit_card_id V4: Overly_large_credit_card_spending: (maintain the list of credit card transaction with purchase amount that is unusually high (>100 times the 3 month moving average)):
    select tx_credit_card_id, tx_amount
      from Mov_avg_amount_per_tx_per_card as ma,
      credit_card_tx as tx
      where ma_credit_card_id=tx_credit_card_id
      and tx_amount>=100*ma__3month_mov_avg The resulting view is a stateless view.

A stateful stream and stateful stream synchronized join (produces stateless stream) is now described.

V5: subtotal_tx_per_card: (total transaction amount per card)
    select tx_credit_card_id as subt_credit_card_id, sum (tx_amount) as subt_amount
      from credit_card_tx
      group by credit_card_id V6: count_per_card: (total number of transaction per card)
    select tx_credit_card_id as cnt_credit_card_id, count(*) as cnt_number_tx
      from credit_card_tx as tx
      group by tx_credit_card_id V7: avg_amount_per_tx_per_card: (average number of transaction per card)
    select cnt_credit_card_id, subt_amount/cnt_number_tx
      from subtotal_tx_per_card as subt,
      count_per_card as cnt
      where subt_credit_card_id=cnt_credit_card_id V7 performs a join between the view snapshots of the two stateful views.

V8: location_subtotal (maintain the subtotal per country, region and state. this is really a 3 dimensional cube)
    select tx_country as lsub_country, tx_region as lsub_region, tx_state as lsub_state, sum(tx_amount) as lsub_amount
      from credit_card_tx
      group by tx_country, tx_region, tx_state V9: location_count (maintain the count per country, region and state. this is really a 3 dimensional cube)
    select tx_country as lcnt_country, tx_region as lcnt_region, tx_state as lcnt_state, count(*) as lcnt_count
      from credit_card_tx
      group by tx_country, tx_region, tx_state V10: region_subtotal: (maintain the average amount per region)
    select subt_region_id, subt, sum (lsub_amount)/sum(cnt_count)
    from location_subtotal as lsub,
      location_count as lcnt
      where subt_region_id=cnt_region_id and subt_country_id=cnt_country_id
      and subt_state_id=cnt_state_id
      group by subt_region_id It is true that V10 could have been computed directly from the credit_card_tx stream. However, with the present of the V8 and V9, it is very efficient to express V10 in this manner as the intermediate result set previously done by V8 and V9 can be leveraged.

A stateless stream and stateless stream synchronized join is now described.

V11: invalid_credit_card_tx: (find the credit card transaction that does not have a valid authorization code for payment rejection):
    select tx_credit_card_id as inv_credit_card_id, tx_auth_code as inv_auth_code
      from credit_card tx as tx left outer join
      credit_card_authorization_log as auth
      on tx_credit_card_id=auth_credit_card_id and
        tx_auth_code=auth_code
      where auth_code is null V12: valid_credit_card_tx: (find the credit card transaction that does have a vaid authorization code for payment rejection)
    select tx_credit_card_id as val_credit_card_id, tx_auth_code as val_auth_code
      from credit_card_tx as tx left outer join
      inv_credit_card_tx as inv
      on tx_credit_card_id=inv_credit_card_id and
        tx_auth_code=inv_auth_code
      where inv_auth_code is null The result is a stateless stream.

Synchronized Join General Algorithm:

As described above, the synchronized join algorithm functions by joining two tables. Each table is either a stateless stream or a stateful stream. Both tables should share a certain common key with an assumed order (either descending or ascending). The key is unique. The join for key n occurs when, and only when, both input streams have processed key n. Each input table contributes its current view snapshot in the join. In other words, the query engine would only process the synchronized join between two streams with respect to key n when both streams have processed the key n.

Typically, in a streaming DBMS, the key can be an event id identifying the event entering the system, or a timestamp indicating the time at which the event enters the system, or a specific column provided by the user that maintains either an ascending order or descending order for all event data entering the system.

Synchronized Join Definition:

A Synchronized Join is defined as joining two tables. Each table is either a stream or a stateful stream. Both tables should have the same originating event stream. The join for event id n (from the originating event id) occurs when, and only when, both tables have processed event id n. Each input table contributes its current view snapshot in the join. In other words, the query engine would only process the join that performs a synchronized join of two tables with respect to event_id n when both streams have processed the event_id n.

Generally, a synchronized join only applies to joins of two streams that have the same originating events. It does not, for example, apply to a table that is a foreign relation, or joins between two streams originating from different event streams.

Synchronization Algorithm for Synchronized Join:

The synchronization algorithm for synchronized join is used by both the stateless and stateful algorithm explained below to synchronize the events being processed. Rows in the current view snapshot of the input streams are marked as UNCHANGED, DELETE and INSERT, representing rows that are unchanged, inserted and deleted from the last current view snapshot.

Algorithms for Joins that Produce Stateless Streams:

Both inner and outer contribute (INSERT, UNCHANGED) rows. The row lists from the input streams matching the common key value are joined together. In other words, row lists with different common key values will not be joined together. Join results are published as INSERT rows. The join result produces the rows in the order of the common key.

Algorithms for Joins that Produce Stateful Streams:

Since each side can contribute 3 difference kinds of rows: UNCHANGED, INSERT, DELETE, there are 9 difference combinations of rows from the join result. The join occurs based on the following phases:

DELETE_ROW:

Phase 1: process the join for delete rows in the left side (delete rows due to the outer deletion)

Left side: s(mode=DELETE_ROWS)

Right side: prepareNext(mode=DELETE_ROWS+UNCHANGED_ROWS)

Phase 2: process the join for delete row in the right side (delete rows due to the inner deletion). Note that the delete rows joining with delete rows has been done in the last step.

Left side: prepareNext(mode=UNCHANGED_ROWS).

Right side: prepareNext(mode=DELETE_ROWS)

INSERT_ROW:

Phase 3: process the join for new rows due to new rows from the right side

Left side: prepareNext(mode=UNCHANGED_ROWS).

Right side: prepareNext(mode=INSERT_ROWS)

Phase 4: process the join for new rows due to new rows from the left side

Left side: prepareNext(mode=INSERT_ROWS).

Right side: prepareNext(mode=INSERT_ROWS+UNCHANGED_ROWS)

UNCHANGE_ROW:

Phase 5: process the join for unchanged rows

Left side: prepareNext(mode=UNCHANGED_ROWS).

Right side: prepareNext(mode=UNCHANGED_ROWS)

In one embodiment, of 9 total possibilities, the following combinations are not valid combinations:

INSERT_ROWS, DELETE_ROWS

DELETE_ROWS, INSERT_ROWS

Because of this, they do not present in the join result.

After a new row is assembled, it is marked as DELETE, INSERT and UNCHANGED as indicated by the above steps. The view then publishes the new current stream snapshot.

More than One Join:

When there is more than one join in the query, each join is carried out with the above algorithm. Each join results in a stream which feeds into the next join.

Join Alignment Due to Empty Row List:

In one embodiment, it is possible that some view may not produce data for a particular key, due to various reasons, such as, for example, all rows from the input row lists of input streams may be filtered out by the WHERE clause or join clause filters. The empty row list may be required for outer join purpose by the derived view above. Under these circumstances, the row list may contain 0 rows. The system takes care of such an occurrence by still publishing a row list with 0 rows. The empty row list is marked with the correct common key.

Join Alignment Due to Data Error:

Error conditions may occur due to bad data in the input streams. For example, bad data may cause arithmetic data overflow (by divided by 0 error). In this case, the input stream may not publish any data at all. Under this circumstance, we need to skip processing of this event based on the common key in the join algorithm. In other words, data belonging to other input streams mentioned in the view would also be discarded.

The join algorithm takes care of this case as follows. When there is an misalignment on the input streams during a synchronized join, the join discards the row list corresponding to the same row list. To detect a misalignment, the join operator checks if the common key is the same for the next event.

Figure 6:
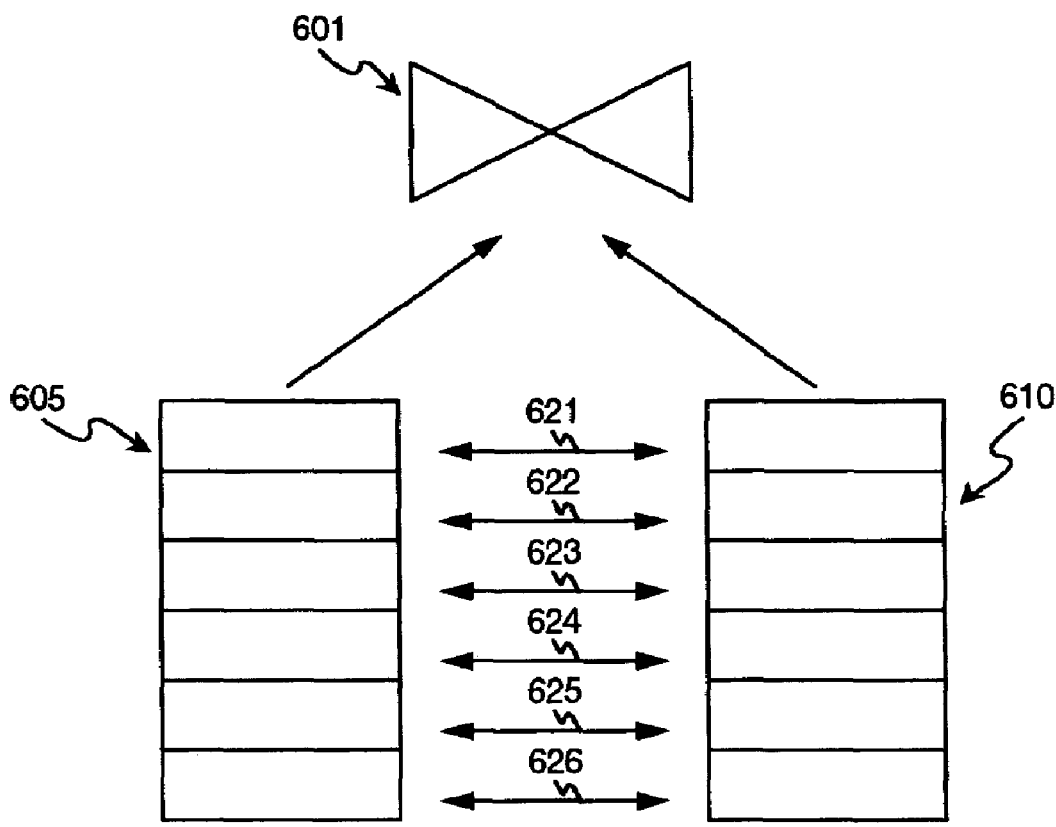
FIG. 6 shows a diagram of an example of a synchronized join with a common key having an ascending key order.

FIG. 6 shows a diagram 600 of an example of a synchronized join with a common key having an ascending key order. For example, assume that the common key value (e.g., keys 621-626) is assumed to be in ascending order. During a synchronized join 601, if the common key value from one input stream (S1) 605 is less than the common key from the other input steam (S2) 610, the row list from S1 is discarded. In the case when the common key value is assumed to be in descending order, and when a misalignment happens, the row list for S2 610 would be discarded.

View Initialization:

Embodiments of the present invention for dynamic initialization and re-initialization of views using persisted and non-persisted events in a streaming database system are now described.

Figure 7:
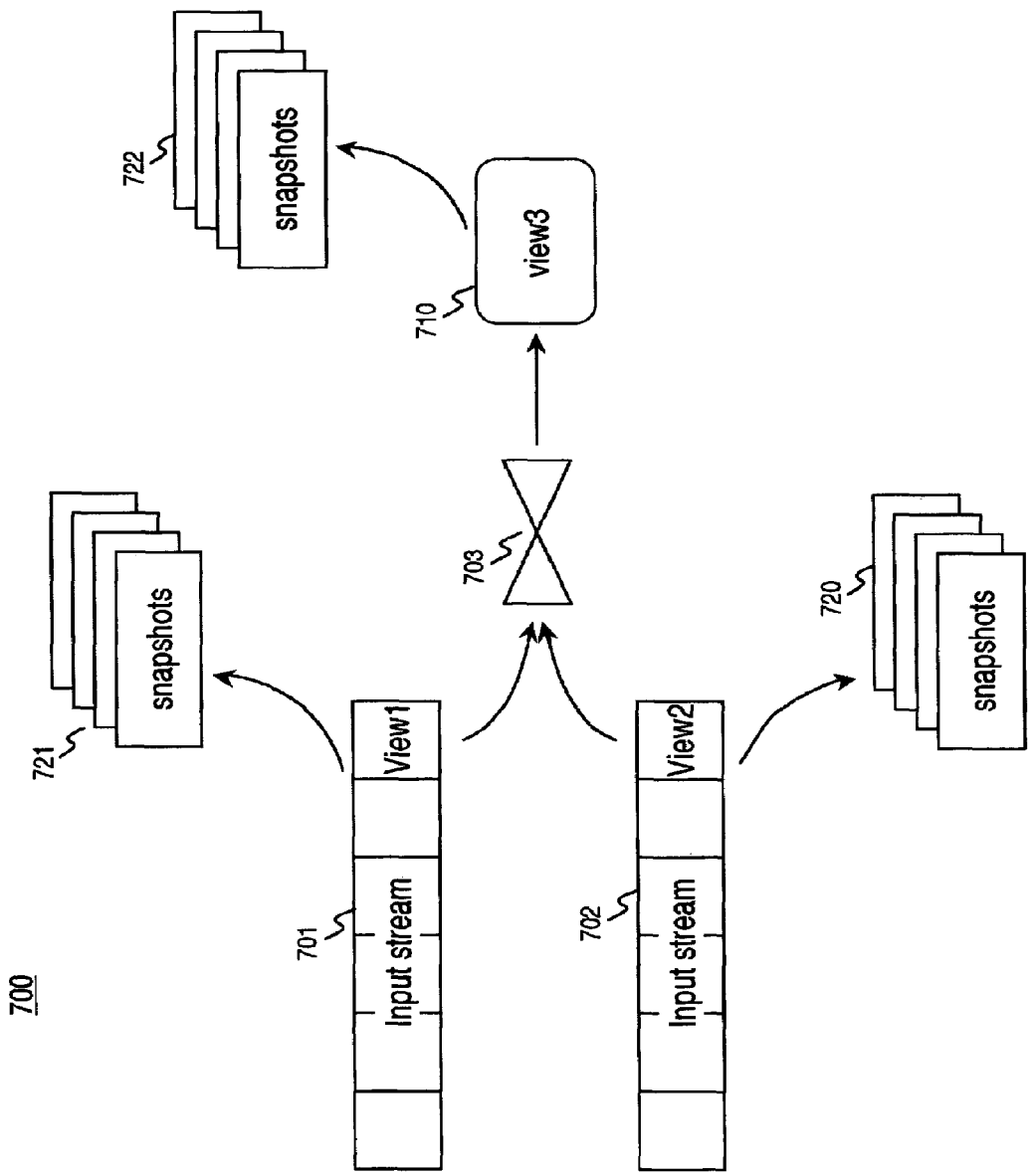
FIG. 7 shows a diagram depicting a view initialization and dynamic update process in accordance with one embodiment of the present invention.

FIG. 7 shows a diagram 700 depicting a view initialization and dynamic update process in accordance with one embodiment of the present invention. As shown in FIG. 7, diagram 700 shows a case where a first input stream 701 (e.g., view 1) and a second input stream 702 (e.g., view 2) are initialized 703 into a resulting view 710 (e.g., view 3).

In a streaming database management system, the views (e.g., view 710), or continuous queries, are being initialized (e.g., initialization 703) at creation time and the views are incrementally and continuously updated in response to new events. For example, when a business view (new view) is created, its state should be calculated to include as many events arriving at the BAM system before the view is created as possible. The more events that are included, the more accurate the state of the new view, and the more accurately the new view can reflect the current state of the system. The process of calculating view state based on previous events is called view initialization.

The preceding events (e.g., the history) can be persisted to a foreign data store, such as a file system and RDBMS, or can be non-persisted as memory events maintained by the event producers. Accordingly, the input stream 701 or the input stream 702 can originate from a persisted RDBMS file system, from non-persisted memory events, or from an existing materialized view. In addition, a materialized view (e.g., view 710) may need to be re-initialized for various reasons. For example, the view may be disabled and then re-enabled, the view state may need to be recovered from failures, or the like.

As described above, there are two kinds of views, a stateful view and a stateless view. In the present embodiment, a stateful view is bounded and contains a bounded number of rows. A stateless view is unbounded and contains an unlimited number of rows.

In one embodiment of the present invention, the current state of a stateful view contains the state of the view calculated including all events included at its view initialization time and arrived after its view initialization at a particular time. The current state of a stateless view contains the state of the view calculated including the last events processed by the view.

Referring still to FIG. 7, the current view state, in accordance with one embodiment of the present invention, is referred to as the current view snapshot. For example, each view can maintain a sequence (unordered or ordered) of preceding current view snapshots, one for each event processed. This is shown in FIG. 7 as the sequence of snapshots 720, from the stream 702, and the sequence of snapshots 721, from the stream 701. In other words, each view can keep track of its view state deriving from the last n events or the events arriving within a last time interval (e.g., last 3 days, last 1 month, or last 2 minutes). These are the recent view snapshots for a view. These snapshots can be used to re-initialize (e.g., the initialization 704), or otherwise update, the materialized view 710. This attribute is true even for higher-level views (e.g., view 710) which are defined on top of other views (e.g., on top of views 701-702). Thus the higher-level materialized view 710 can similarly maintain a sequence of snapshots 722.

It should be recalled that, as described above, a stateless view is an INSERT-only view. In one embodiment, to keep track of the current view snapshot of a stateless view, since it does not need to inform its consumers about any updates to its current view snapshot, it only needs to send insert only rows. Therefore, the view state for a stateless view is represented with a list of rows, marked as INSERT. These rows represent the rows produce by this view due to the last event.

It should be recalled that, a stateful view is an INSERT-UPDATE view. In one embodiment, to keep track of the current view snapshot of a stateful view, it is only needed to inform the update of a row to the view consumer. Each row is identified by a rowID. The rowID is unique within the rows produced by the view. The update to a row is done by sending up a deletion of the row with the same rowID and old content of its column values, and an insertion of the new row with the same rowID and new content of its column values. The current view snapshot of a stateful view then contains the rows presenting the deleted rows, the inserted rows, and the unchanged rows.

Therefore, in one embodiment of the present invention, each current view snapshot is practically a list of rows, and so is referred to as a row list. Each such row list has an event ID assigned to it, identifying the event for which the current view snapshot is created. It should be noted that it may be possible that a row list contains no rows (for example, the WHERE clause filters out all input rows), but the row list still exists (e.g., containing 0 rows), and that it still contains an event ID.

In one embodiment of the present invention, the recent view snapshot contains a sequence of previous current view snapshots for each view. This can be used, for example, to maintain the view snapshot that was created in the last two hours, or the view snapshot that was created in the last "n" events. A last-x moving window specification may also be determined along with a partitioning of the output rows based on a partition key. In other words, one can maintain the last-x rows moving window per partition key value.

In one embodiment, the recent view snapshots may be persisted to a persistence data store, like a RBDMS or a file system. Alternatively, the recent view snapshots may simply stay in memory. These data may then be read back for the purpose of view initialization for any views that derived from this view.

The view initialization process, in accordance with one embodiment, then takes the recent view snapshots from the views that it derives from, and calculates the view states by replaying each current view snapshot following the order of the event. These events are then processed by the view in the same manner as if they arrived at the view one current view snapshot at a time when the events entered the system. The current view snapshot and recent view snapshot of the new view are then computed accordingly. This applies to many kinds of streaming queries, including, but not limiting to, stream join, time series aggregate (e.g., a 50 day moving average of a stock price), and others.

It should be noted that, since the amount of data in the recent view snapshot may be large and it may not be necessary for a derived view to compute its view states based on a complete set of recent view snapshots, a user is allowed to specify the number of recent view snapshots to be included during view initialization and view re-initialization. This can be done to obtain greater speed.

It should be noted that an optimization (e.g., to obtain greater speed in the initialization process) can be implemented in those cases where a given view is derived from only one input stream. For example, for a particular query block, when there is only one input stream for a view and that input stream is stateful, the view can be initialized by using only the last snap shot of the input stream. This optimization results in a much faster initialization process.

Example applications of a dynamic initialization and re-initialization process in accordance with embodiments of the present invention are now described.

In a view initialization application, embodiments of the present invention function by initializing a new view so as to compute the view state to include as many events as possible that are produced by the lower level view. This will produce a more accurate view state that can include more data.

In a recovery of view state application, the state of a view, when it is being recovered, can be recomputed using a dynamic initialization and re-initialization process.

In an enabling and disabling of view(s) application, the view is re-enabled after it is disabled. At the time of view re-enabling, one can employ dynamic initialization and re-initialization process techniques to get back the state of the view.

In a load balancing of view maintenance application, when views are being maintained, the dynamic initialization and re-initialization process techniques can be used to temporary suspend processing of a particular view to balance load on the system, and then resume processing of the view.

In a batch processing of events application, the dynamic initialization and re-initialization process techniques can be used for batch processing a number of events consumed by a view. The events consumed by a view can be batched and be consumed by the view one batch at a time. During batch processing, parallel query processing can speed up the incremental maintenance of the views and thus enhance performance.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for dynamically initializing a view for a streaming database system, comprising:
   accessing, by a computing device, at least one stream of events in real time while said at least one stream of events is received by said computing device as output from a streaming database system, wherein said computing device is external to said streaming database system;
   materializing, by said computing device, an initialized view from said at least one stream of events as said at least one stream of events is received from said streaming database system, wherein said initialized view is dynamically defined from said at least one stream of events, and wherein materializing said initialized view comprises receiving a first dynamic view definition and generating said initialized view according to said first dynamic view definition;
   producing, by said computing device, a sequence of view snapshots from said initialized view, wherein each view snapshot in said sequence corresponds to an individual event within said at least one stream of events, wherein each individual event occurs after events of said at least one stream of events are used to materialize said initialized view;
   storing said sequence of view snapshots;
   receiving a second dynamic view definition, said second dynamic view definition being different than said first dynamic view definition; and
   using said sequence of view snapshots to generate, by said computing device, a re-initialized view according to said second dynamic view definition, wherein generating said re-initialized view comprises incorporating events used to materialize said initialized view and events of said sequence of view snapshots, and wherein generating said re-initialized view comprises calculating a view state of said re-initialized view by retrieving and replaying said sequence of view snapshots.

2. The method as recited in claim 1 wherein said initialized view comprises a plurality of row data structures.

3. The method as recited in claim 1, wherein said initialized view comprises a stateful view resulting from a stateful stream, said stateful view having a bounded number of rows.

4. The method of claim 3, wherein each view snapshot of said stateful view comprise a state of said stateful view including events existent at said materializing of said stateful view and events accessed after said materializing of said stateful view at a particular time.

5. The method of claim 1, wherein said initialized view comprises a stateless view resulting from a stateless stream, said stateless view having an unbounded number of rows.

6. The method of claim 5, wherein each view snapshot of said stateless view comprises a state of said stateless view including events existent at said materializing of said stateless view, including a last event processed during said materializing of said stateless view.

7. The method of claim 1, further comprising:
   processing said sequence of view snapshots by maintaining a sequence of a plurality of preceding current view snapshots.

8. The method of claim 7, further comprising:
   applying a batch set of events to said processing of said sequence of view snapshots, wherein each event of said batch set has a corresponding view snapshot in said sequence.

9. The method of claim 1, wherein said generating of said initialized view is configured to accomplish a recovery of a view state.

10. The method of claim 1, wherein said generating of said initialized view is configured to accomplish a re-enabling of a view after a disabling of a view.

11. The method of claim 1, wherein said generating of said initialized view is configured to accomplish a load balancing of a view maintenance process.

12. The method of claim 1, wherein accessing at least one stream of events comprises:
   issuing, by said computing device, a stream query to said streaming database system; and
   receiving, by said computing device, each of said events of said at least one stream of events as a result of said stream query without reissuing said stream query to said streaming database system.

13. A system comprising:
   a streaming database system that outputs at least one stream of events;
   a computing device, external to said streaming database system, comprising a view engine configured to access said at least one stream of events in real time while said at least one stream of events is received as output from said streaming database system, to materialize an initialized view from said at least one stream of events, wherein said initialized view is dynamically defined from said at least one stream of events, said view engine further configured to receive a first dynamic view definition and generate said initialized view according to said first dynamic view definition, to produce a sequence of view snapshots from said initialized view, wherein each view snapshot in said sequence corresponds to an individual event within said at least one stream of events, wherein each individual event occurs after events of said at least one stream of events are used to materialize said initialized view, store said sequence of view snapshots, receive a second dynamic view definition, said second dynamic view definition being different than said first dynamic view definition, and use said sequence of view snapshots to generate a re-initialized view of a second view according to said second dynamic view definition, wherein said view engine is configured to incorporate said events used to materialize said initialized view and events of said view snapshots and to calculate a view state of said re-initialized view by retrieving and replaying said sequence of view snapshots in order to generate said re-initialized view, wherein said streaming database system is configured to send said at least one stream of events to said computing device.

14. The system of claim 13, wherein said computing device issues a stream query to said streaming database system, and wherein said streaming database system sends events of said at least one stream of events to said computing device as a result of said stream query without said computing device reissuing said stream query to said streaming database system.

15. The system of claim 13, wherein said initialized view comprises a stateful view resulting from a stateful stream, said stateful view having a bounded number of rows.

16. The system of claim 15, wherein each recent view snapshot of said stateful view comprises a state of said initialized view including events existent at said materializing of said initialized view and events accessed after said materializing of said initialized view at a particular time.

17. The system of claim 13, wherein said initialized view comprises a stateless view resulting from a stateless stream, said stateless view having an unbounded number of rows.

18. The system of claim 17, wherein each recent view snapshot of said stateless view comprises a state of said initialized view including events existent at said materializing of said initialized view, including a last event processed during said materializing of said initialized view.

19. The system of claim 13, wherein said view engine is further configured to process said sequence of recent view snapshots by maintaining a sequence of a plurality of preceding current view snapshots.

20. The system of claim 19, wherein said view engine is further configured for applying a batch set of events to said processing of said sequence of recent view snapshots, wherein said event of said batch set has a corresponding recent view snapshot in said sequence.

21. A computer-readable medium comprising instructions for causing a programmable processor of a computing device external to a streaming database to:
 access at least one stream of events in real time while said at least one stream of events is received by said computing device as output from a streaming database system, wherein said computing device is external to said streaming database system;
 materialize an initialized view from said at least one stream of events as said at least one stream of events is received from said streaming database system, wherein said initialized view is dynamically defined from said at least one stream of events, and wherein said instructions to materialize said initialized view comprise instructions to receive a first dynamic view definition and generate said initialized view according to said first dynamic view definition;
 produce a sequence of view snapshots from said initialized view, wherein each view snapshot in said sequence corresponds to an individual event within said at least one stream of events, wherein each individual event occurs after events of said at least one stream of events are used to materialize said initialized view;
 store said sequence of view snapshots;
 receive a second dynamic view definition, said second dynamic view definition being different than said first dynamic view definition; and
 use said sequence of view snapshots to generate a re-initialized view according to said second dynamic view definition, wherein said instructions to generate said re-initialized view comprise instructions to incorporate events used to materialize said initialized view and events of said sequence of view snapshots, and wherein said instructions to generate said re-initialized view comprise instructions to calculate a view state of said re-initialized view by retrieving and replaying said sequence of view snapshots.

22. The computer-readable medium of claim 21, wherein said initialized view comprises a stateful view resulting from a stateful stream, said stateful view having a bounded number of rows.

23. The computer-readable medium of claim 22, wherein each view snapshot of said stateful view comprises a state of said stateful view including events existent at said materializing of said stateful view and events accessed after said materializing of said stateful view at a particular time.

24. The computer-readable medium of claim 21, wherein said view comprises a stateless view resulting from a stateless stream, said stateless view having an unbounded number of rows.

25. The computer-readable medium of claim 24, wherein each view snapshot of said stateless view comprises a state of said stateless view including events existent at said materializing of said stateless view, including a last event processed during said materializing of said stateless view.

26. The computer-readable medium of claim 21, further comprising instructions for causing said programmable processor of said computing device to process said sequence of view snapshots by maintaining a sequence of a plurality of preceding current view snapshots.

27. The computer-readable medium of claim 26, further comprising instructions for causing said programmable processor of said computing device to apply a batch set of events to said processing of said sequence of view snapshots, wherein each event of said batch set has a corresponding view snapshot in said sequence.

* * * * *